INVENTORS
NEWTON E. SPIESS JR. &
ARNOLD R. ADLER

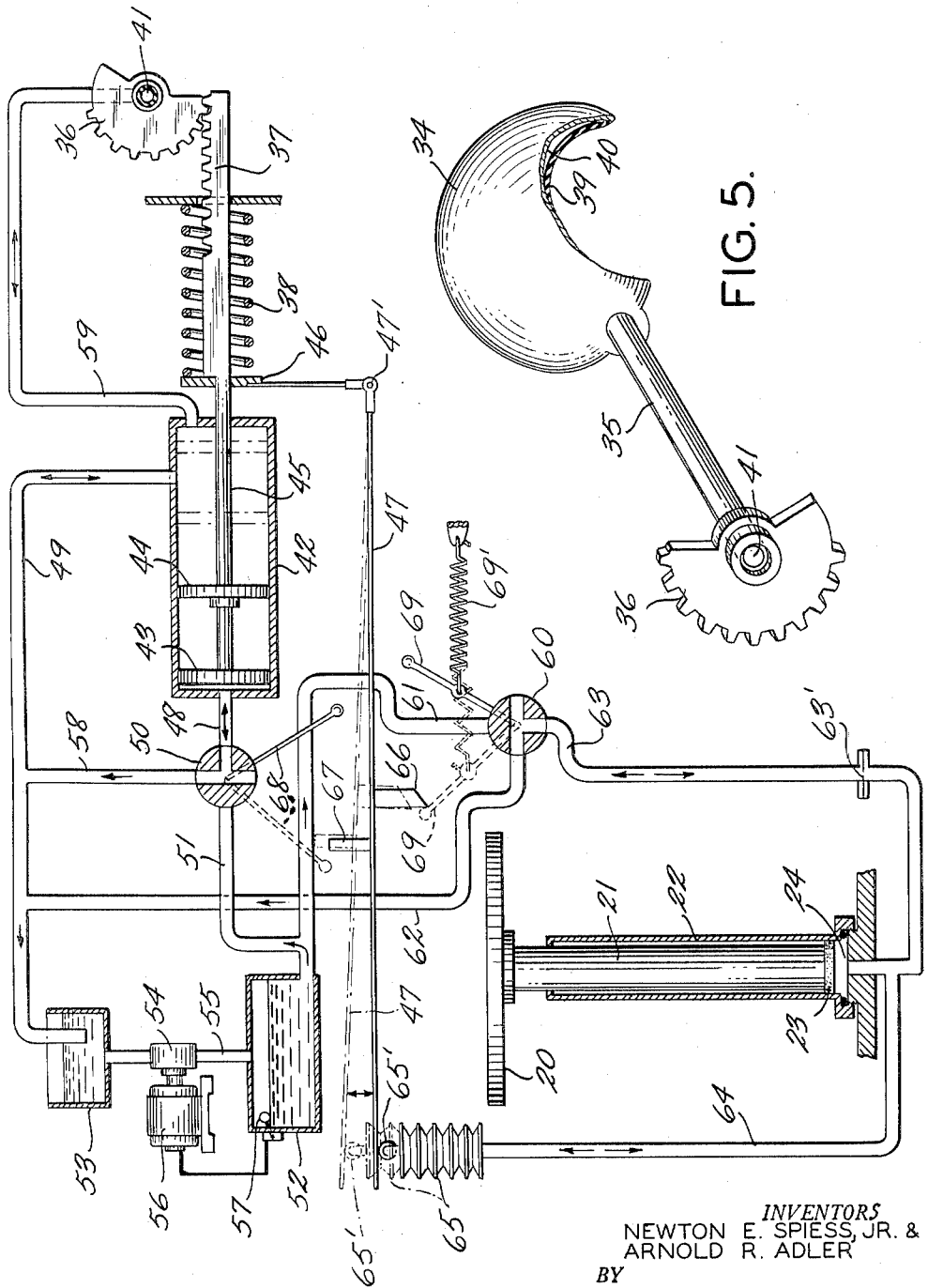

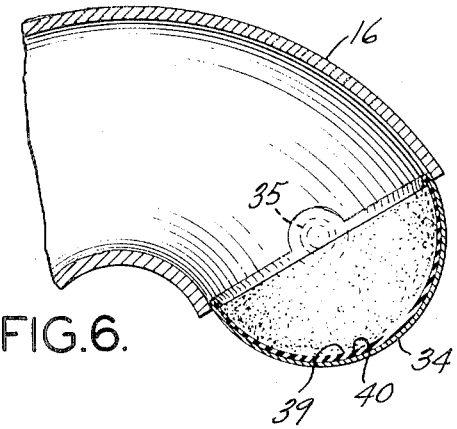
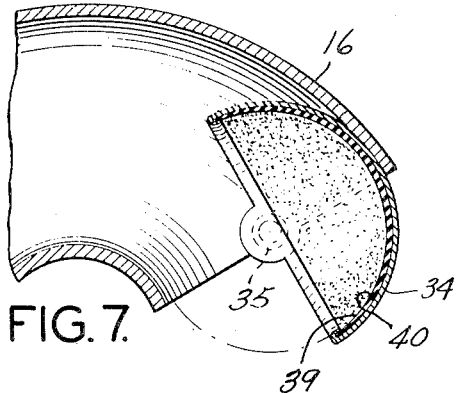
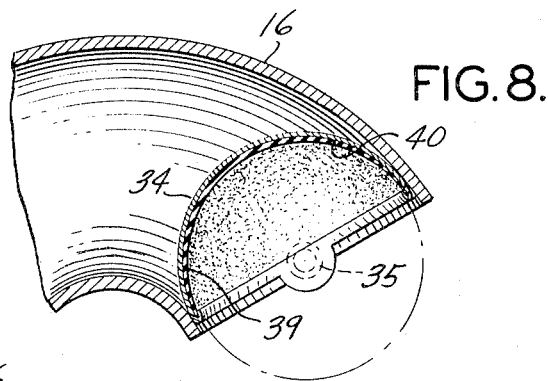
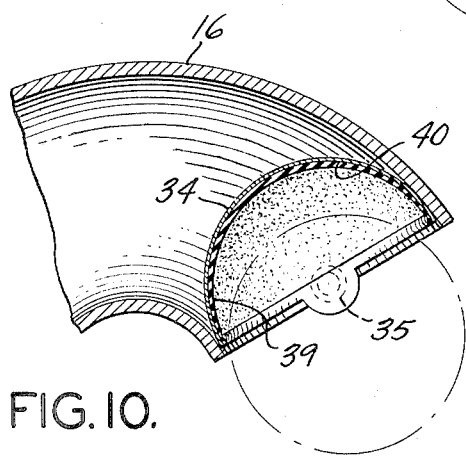
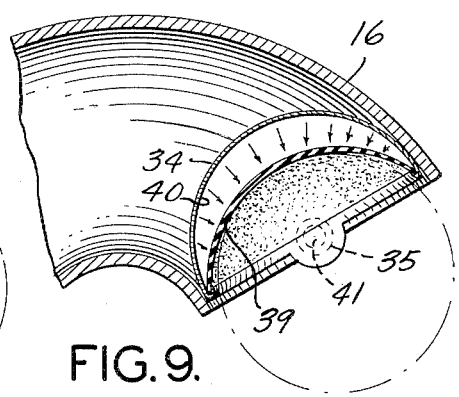

United States Patent Office 2,719,494
Patented Oct. 4, 1955

2,719,494

ICE CREAM DISPENSING MECHANISM

Newton E. Spiess, Jr., Oakdale, and Arnold R. Adler, New York, N. Y., assignors to National Dairy Research Laboratories, Inc., Oakdale, N. Y., a corporation of Delaware Application July 6, 1951, Serial No. 235,518

13 Claims. (Cl. 107—8)

The present invention relates to ice cream dispensing mechanisms and, more particularly, to ice cream dispensing mechanisms wherein the ice cream is formed into suitable shapes, and after being so formed, is delivered as a dispensed commodity.

More particularly, the invention relates to mechanisms of the above character wherein a body of ice cream is subjected to pressure which is utilized to cause it to flow through an extruding orifice upon certain predetermined operations. The extruded ice cream is then formed into a desired shape in order that it may be dispensed.

Devices of this general character have been provided heretofore not only to dispense ice cream in suitable shapes, but to coordinate the dispensing operation with related operations in such fashion that the ice cream is placed in a pastry cone and then dispensed. The mechanism presently available for accomplishing these operations is of complicated nature and, therefore, is expensive and additionally, does not provide the accurate metering qualities that are to be desired. Moreover, proper maintenance of these machines from a sanitation standpoint is difficult.

In accordance with the present invention a mechanism of the above character is provided wherein the elements may be maintained in a sanitary condition at all times and wherein the number of operating parts is relatively few, and the original cost and maintenance are, therefore, reduced substantially over those factors insofar as they pertain to existing machines.

Another object of the invention is to provide a mechanism of the above character wherein a desired and precise quantity of ice cream may be dispensed upon every operation of the machine, and wherein the character of the ice cream so dispensed is maintained at a desired degree of uniformity.

Yet another object of the invention is to provide a machine of the above character having relatively few parts which are convenient to assemble and disassemble, and which is of such size that it may be available for use in soda fountains and like locations.

In order that the foregoing and other objects may be attained, the invention will now be described with the accompanying drawings, wherein Figure 1 is a perspective view showing one form of apparatus in which this invention may be embodied;

Figure 5 is an enlarged partial view in perspective, showing the dipper mechanism of the present invention;

Figure 6 is a partial view, slightly enlarged, showing the extruding mechanism of Figure 2 with the dipper in its normal position;

Figure 7 is a view similar to Figure 6, showing the manner in which the dipper is moved in its initial stage of forming a ball of ice cream;

Figure 8 is a view similar to Figure 6, showing the position of the dipper after it has moved through 180 degrees to form a ball of ice cream;

Figure 9 is a view similar to Figure 8, showing the manner in which the dipper diaphragm is actuated to dispense the ball of ice cream;

Figure 10 is a view similar to Figure 8, after the diaphragm has been restored to its normal position and the ball of ice cream has been discharged therefrom; and Figure 11 is a diagrammatic view illustrating the fluid system and the control mechanism constructed in accordance with the present invention.

Figure 1:
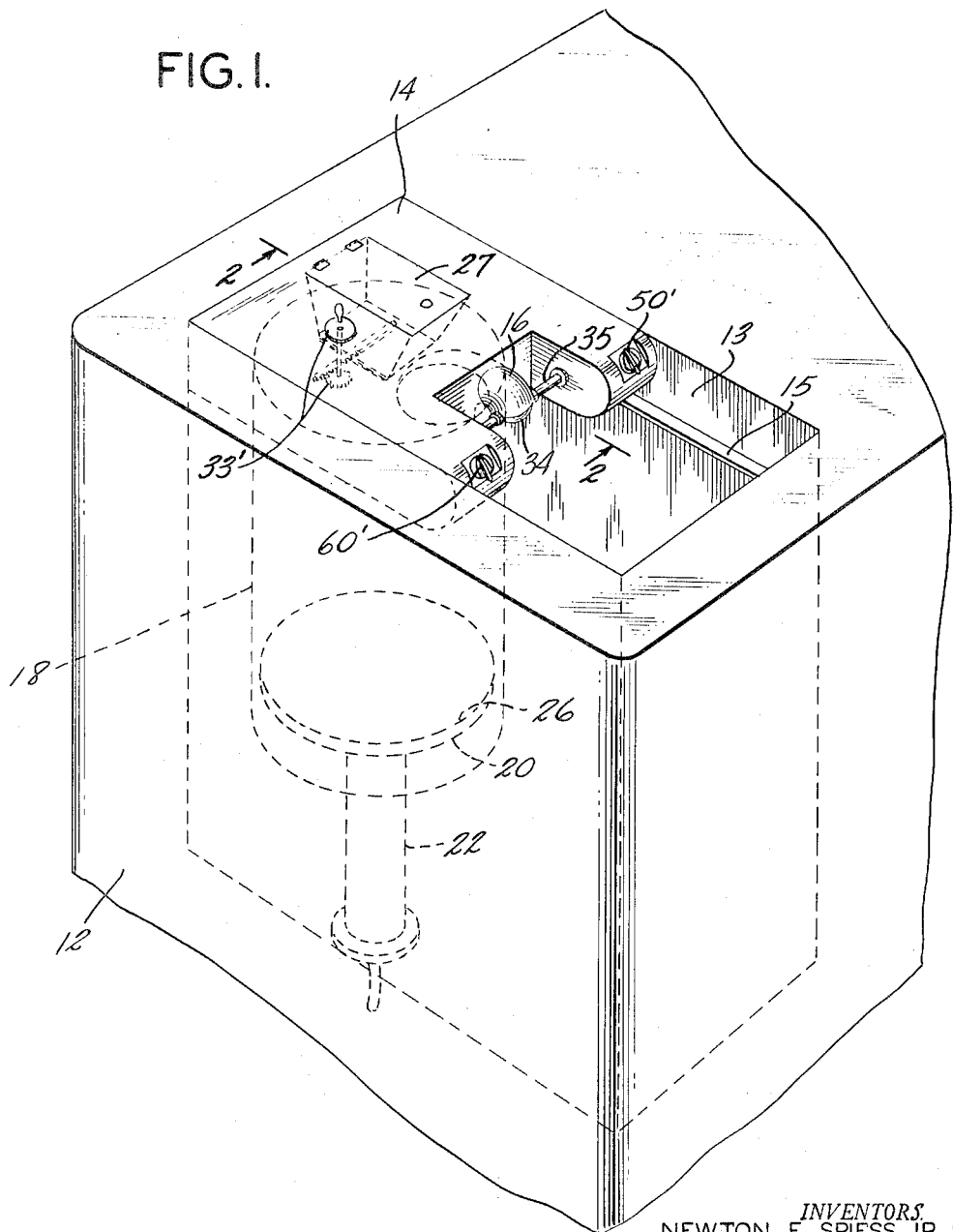
Figure 2:
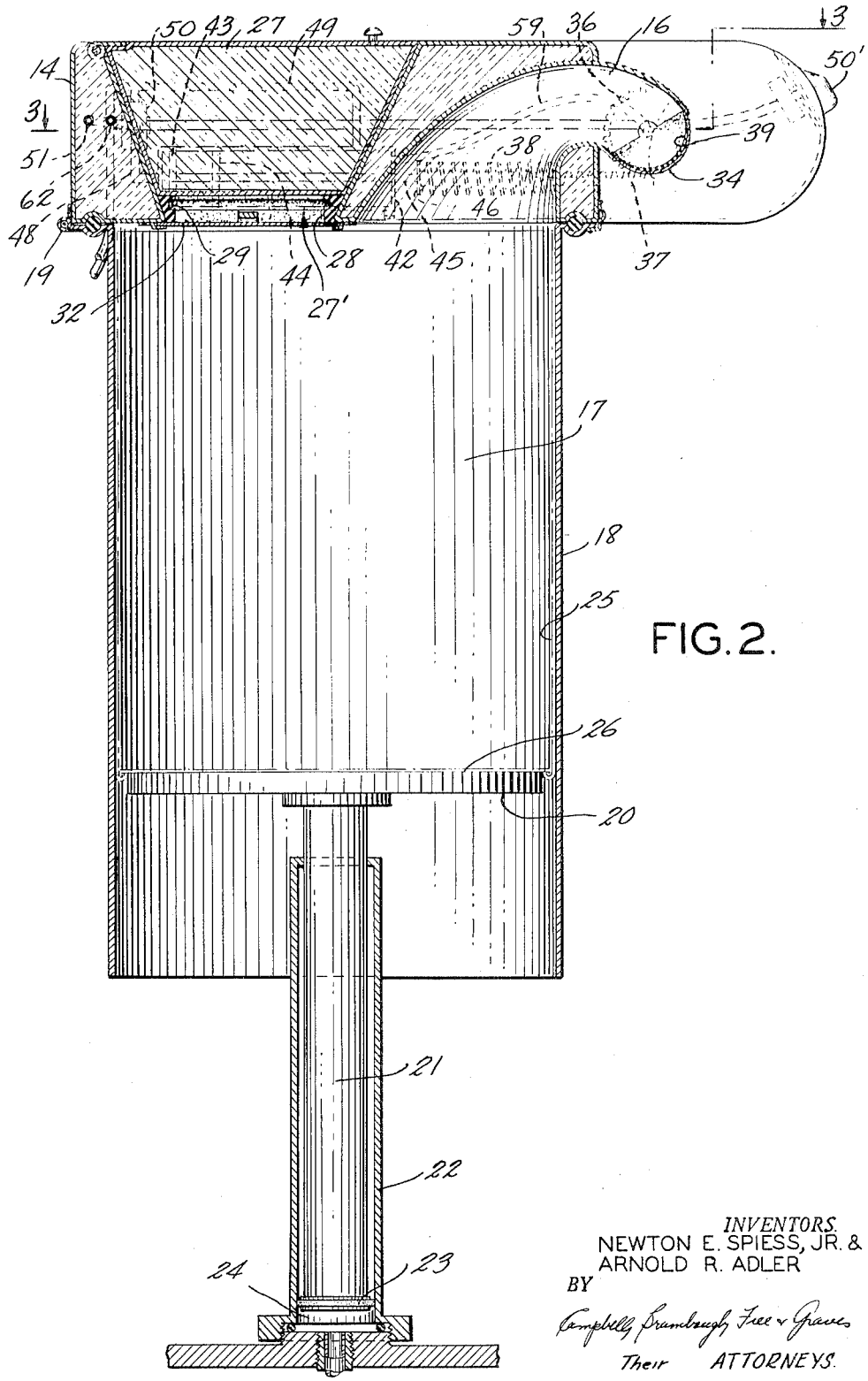
Figure 2 is a view in vertical section, taken on the plane indicated by the line 2—2 of Figure 1, and looking in the direction of the arrows.
Figure 3:
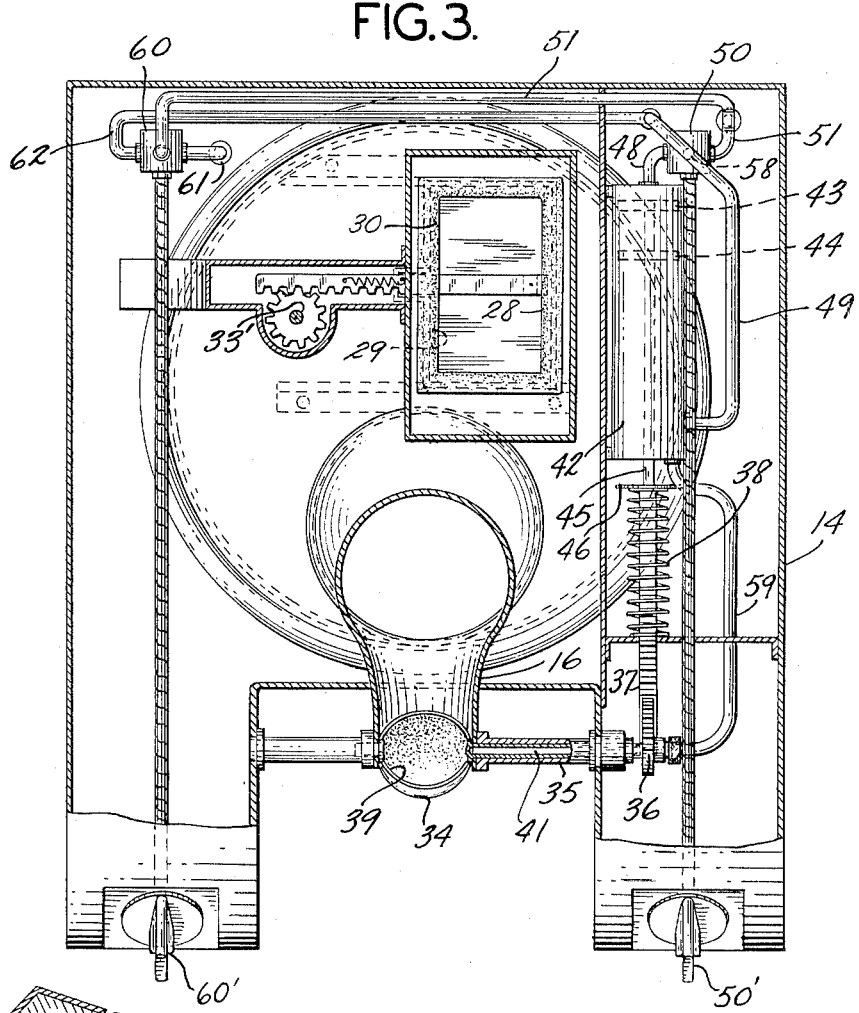
Figure 3 is a view in horizontal section, taken on the plane indicated by the broken line 3—3 of Figure 2, and looking in the direction of the arrows.

With reference to Figures 1 to 5, inclusive, a conventional ice cream cabinet is illustrated at 12 as being formed with an opening 13 at the top thereof, this being the structural characteristic of a conventional ice cream cabinet. Within the opening 13, the mechanism of the present invention is installed. As will be seen from Figures 1 and 2, the mechanism includes a lid 14 which may be supported upon ledges 15 within the opening 13. The lid is provided with an extruding spout 16 communicating with a cylindrical comestible chamber 17 formed by a comestible cylinder 18 that is hinged at 19 to the lid 14. A piston 20 is received within the cylinder 18, hence within the comestible chamber 17, and is supported upon a piston rod 21 that is slidably received within an actuating cylinder 22, the piston rod 21 carrying a piston head 23 that cooperates with the cylinder 22 to actuate the piston in response to the existence of a fluid under pressure within the lower extremity 24 of the actuating cylinder 22. As is indicated in dot-and-dash lines of Figure 2, a conventional container of ice cream 25 is placed within the cylinder 18, being of such dimension that it will fit snugly therein. The bottom plate 26 of the container 25 thus rests upon the piston 20 and, when sufficient pressure is applied to the piston, the bottom plate 26, together with the ice cream within the container 25, is forced upwardly to cause the ice cream to be forced into the extrusion spout 16.

Figure 4:
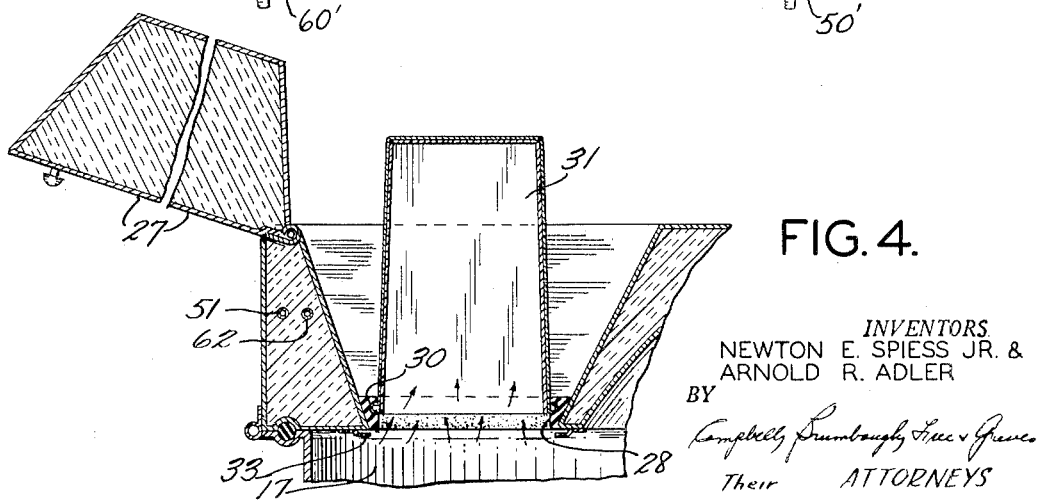
Figure 4 is a partial view in section, similar to the upper left-hand part of Figure 2, showing the manner in which cartons may be filled by the mechanism of the present invention.

In order that cartons may be filled with ice cream, the lid 14 is provided with a discharge opening 27' closed by a hinged trap door 27 and a gasket 28 having an internally slotted portion 29 within which the rim 30 of a container 31 may be inserted (Figure 4). When a container is placed in such position and pressure is applied to the ice cream within the cylinder 18, the container will be filled. The ice cream thus inserted in the container may be severed from the bulk of the ice cream within the cylinder 18 by means of a plate 32 which is slidably mounted in guide flanges 33 carried on the underside of the lid 14. Actuation of the plate 32 may be accomplished by a rack and gear mechanism operated by a manually operated handle and pinion gear assembly 33' upon the forward portion of the lid 14.

Within the outlet of the extruding spout 16 a scoop 34 is provided. The scoop is of hemispherical shape and is formed so that it fits snugly within the outlet of the spout 16. It is carried upon a shaft 35 which is journaled within the spout at the opposite sides thereof and is provided with a gear 36 that is engaged by a longitudinally movable rack 37, the rack normally being urged into the position illustrated in Figure 2 by means of a spring 38.

The scoop 34 is provided with an inner flexible diaphragm 39 which is securely attached to the periphery of the scoop 34 with a fluid-tight connection. A chamber 40 of variable size is thus provided between the diaphragm 39 and scoop 34, this chamber communicating with a tube 41.

The manner in which the actuation of the piston 20 is coordinated with the actuation of the scoop 34 is illustrated diagrammatically in Figure 11. Within the lid 14 there is provided a multiple cylinder 42 within which first and second pistons 43 and 44 are mounted by means of a piston rod 45. The piston rod 45 is formed upon or is an extension of the rack 37, and carries a flanged plate 46 to which a control rod 47 is pivoted at 47'. The spring 38 bears against the plate 46 in order to urge the rack and pistons 43, 44 to the left as viewed in Figure 11. Fluid under pressure is introduced into the cylinder 42 by means of a pressure pipe 48 and is discharged from the cylinder 42 through a discharge duct 49. As will be described more fully below, the piston 43 works in the portion of the cylinder to the left of the discharge duct 49 while the piston 44 works to the right of the duct 49, even though part of its stroke is in the left-hand portion. Thus, in effect, there are two cylinders and two pistons. The fluid for the cylinder 42 is derived from a two-position valve 50 which receives the fluid under pressure from a conduit 51 which is connected to an accumulator 52. It is actuated by a control handle 50' mounted upon the forward portion of the lid 14. The fluid is derived from a sump or other suitable source of supply 53 and is pumped into the accumulator by means of a pump 54 which communicates with the sump 53 and accumulator 52 by means of a pipe 55. An electric motor 56 is provided, being suitably controlled by a pressure switch 57 within the accumulator 52. A discharge pipe 58 connects the two-way valve 50 with the discharge conduit 49 in order that the left-hand end of the cylinder 42 may be vented when the valve 50 is in the position illustrated in Figure 11.

The right-hand end of the cylinder 42 communicates with a conduit 59 which is connected with the conduit 41 in order that the piston 44 may supply fluid under pressure to the chamber 40 after it passes the port through which the conduit 49 communicates with cylinder 42. It will thus be seen that when fluid under pressure is introduced into the left-hand end of cylinder 42, the piston 43 moves the piston rod 45 and rack 37 to the right and causes the scoop 34 to move 180 degrees. At this point, the piston 44 passes the conduit 49 and further movement of the piston 43 causes the piston 44 to force the fluid that is trapped in the right-hand end of the cylinder 42 into the conduit 59. This will distend the diaphragm 39 and increase the volume of the chamber 40 to cause the ball of ice cream that has been cut to be discharged from the scoop.

Actuation of the piston 20 is caused by a two-way valve 60 that communicates with the accumulator 52 through a conduit 61, and with the discharge pipe 49 through a conduit 62. This valve is operated by a manually operated handle 60' on the forward portion of lid 14 or by a dog or actuating arm 66 on the control rod 47 upon the return motion of control rod 47. Fluid from the conduit 61 is directed from the valve through a conduit 63 to the pressure end space 24 within the cylinder 22. An orifice 63' is provided in the conduit to limit the rate at which oil flows into cylinder 22, thereby preventing too sudden an application of pressure. In this connection, it should be observed that the rate of application of pressure in the space 24 must be slow enough to allow a bellows 65 to follow the action thus preventing the bellows from tripping arm 66 before the scoop or bulk container is filled. The space 24 also communicates through a conduit 64 with the bellows actuator 65. The bellows actuator is provided with a roller 65' to engage the pivoted rod 47 and move it upwardly. The control rod 47 is also provided with an actuator arm 67, and in order that the valves 50 and 60 may be automatically actuated, they are provided with arms 68 and 69, spring 69' normally urging arm 69 to the right. The arm 68 is operated by the actuating arm 67, while the arm 69 is operated by the actuating arm 66. Preferably, the valve 50 is formed to have a snap action so that it will move through its full travel upon final motion of the arm 67 to the right.

The operation of the foregoing mechanism will now be described. If it is assumed that it is desired to dispense a single portion of ice cream using the scoop or ball dispenser 34, and also that the mechanism has previously dispensed a ball of ice cream so that the scoop is charged with ice cream, as shown in Figure 6, the operating handle 50' is turned through ninety degrees to cause communication to be established between the conduits 51 and 48. Fluid under pressure will thus be delivered to the cylinder 42 from the accumulator 52, and the rack 37 will be moved outwardly to cause the scoop to be moved through 180 degrees. The rack 37 and gear 36 are so formed that the latter may be turned through 180 degrees, and then there is no further turning force exerted because the straight portions of the rack and gear are in engagement rather than the toothed portions thereof. At this point, the piston 44 passes the conduit 49, and the trapped fluid within the right-hand cylinder 42 is forced into the conduit 59 and chamber 40 to cause the diaphragm 39 to be moved outwardly. In this fashion the ball of ice cream that has been cut by the scoop 34 is expelled from the dipper.

Movement of the rack 37 is accompanied by corresponding movement of the rod 47 to cause the arm 67 to engage and move the arm 68 that actuates the valve 50. In this fashion when the piston 44 reaches the limit of its movement, as illustrated in dot-and-dash lines in Figure 11, the valve 50 will have been moved to the position illustrated in Figure 11, at which time the cylinder 42 communicates with the discharge conduit 49 and permits the spring 38 to return the piston and piston rod to the normal position illustrated in solid lines in Figure 11. As the piston 44 returns to the left, the fluid in the conduit 59 and chamber 40 will be withdrawn to permit the rubber diaphragm 39 to return to its normal position, as illustrated in Figures 6, 7, and 8. Moreover, fluid will have been withdrawn from the reservoir 53 through the conduit 49 to fill the right-hand portion of the cylinder 42, and the rack teeth 37 will have engaged the teeth on the gear 36 to return the scoop 34 to the position illustrated in Figure 6.

Upon movement of the arm 47 to the left, the actuating arm or dog 66 engages the arm 69 of the valve and moves the latter in a counter-clockwise direction through ninety degrees to cause the conduit 61 to communicate with the conduit 63. As a result, fluid under pressure will flow through the conduit 63 to the cylinder 22 to apply pressure to the piston 20 and cause the ice cream to be forced into the extrusion spout in order that it may fill the scoop 34. The pressure will continue until it is sufficient to expand the bellows actuator 65 until it moves the rod 47 upwardly and frees dog 66 from arm 69, permitting the latter to be restored to the position illustrated in Figure 11. At this time, the conduit 63 will again communicate with the conduit 62 and relieve the pressure from the piston 20. In this fashion, the ice cream is not under pressure during the time that the scoop 34 moves to form a ball of ice cream.

The filling of a container or package of ice cream is accomplished by inserting the container within the groove 29 of the member 28. The closure 32 is then opened by the mechanism 33, and the operating handle 60' is then turned to the left through ninety degrees. This causes the valve 60 to establish communication between the conduits 61 and 63 to apply pressure to the ice cream and thus cause it to fill the container. When the container is filled, the bellows mechanism 65 will return the valve 60 to the position illustrated in Figure 11, and the pressure upon the ice cream will be removed. The closure member 32 is then closed, and the container is removed.

It will be understood, of course, that the container 31 is provided with a carton of like shape, the carton being the ultimate container for the ice cream as it is delivered to the customer.

From the foregoing it will be seen that a dispensing device has been provided having a relatively few number of operating parts that are easily accessible and thus readily serviced and maintained in a sanitary condition. Moreover, the utilization of the fluid power makes available a source of power which will provide a rapid operation of the mechanism without requiring a large and relatively powerful electric motor. In this connection, it is to be observed that air may be utilized as the fluid for actuation, the diaphragm 39 being subjected to air pressure in the forward end of the cylinder 42. The energy stored in the accumulator 52 is released in relatively short bursts and at high power and may be restored to the accumulator over longer periods of time, during which time the dispensing unit may not be in operation.

While the invention has been described with specific reference to the accompanying drawings, it is not to be limited save as defined in the appended claims.

We claim:

1. A molding device for plastic comestibles comprising a support to contain a supply of the comestible, a scoop journaled to turn in the support, a flexible diaphragm in the scoop, means to turn the scoop from a normal position facing the supply, and in which its convex side is exposed, to a position in which such side lies within the support to form a ball of the comestible, said means comprising a rack and pinion, a cylinder, a piston in the cylinder to actuate the rack, a fluid pressure source to actuate the piston, and means responsive to the movement of the piston to actuate the diaphragm when the scoop reaches the last named position.

2. A molding device according to claim 1, said means to actuate the diaphragm including a second piston and cylinder means, a duct to transmit fluid under pressure from the second cylinder means to the space between the scoop and diaphragm.

3. A molding device according to claim 1, including a piston rod to connect the piston to the rack, a second piston mounted on the rod spaced from the first cylinder, means for the second piston comprising an extension of said cylinder, a first duct to connect the pressure source to the end of the cylinder remote from said extension, a second duct to connect the extension to the space between the scoop and the diaphragm, and a third duct to connect the cylinder adjacent said extension to a fluid reservoir, whereby when the second piston passes the third duct fluid will be trapped in the extension and be forced into the space between the scoop and diaphragm to move the diaphragm with respect to the scoop.

4. In a fluid pressure system for operating a comestible dispenser including a comestible chamber having a piston therein, and a rotatable comestible scoop in communication with the chamber, the invention comprising a cylinder and piston connected to actuate the piston in the chamber, a second piston and cylinder to actuate the scoop, a source of fluid pressure, duct means connecting the pressure source with the first and second cylinders, valves in the duct means, second duct means connecting the valves to a fluid reservoir, and means including means responsive to motion of the second piston to actuate the valves to selectively introduce fluid under pressure into the first and second cylinders and to relieve the fluid pressure therein.

5. In a fluid pressure system for operating a comestible dispenser including a comestible chamber having a piston therein, and a rotatable comestible scoop in communication with the chamber, the invention comprising a first cylinder and piston to actuate the piston in the first cylinder, a second piston and cylinder to actuate the scoop, a source of fluid pressure, first and second duct means respectively connecting the pressure source with the first and second cylinders, first and second two-way valves disposed respectively in the first and second duct means, manual means to actuate the second valve, and means actuated by the second piston to actuate the second valve.

6. A fluid pressure system according to claim 4 wherein the means to actuate the valves comprises linkage means movable with the second piston to introduce pressure to the chamber upon rotational movement of the piston.

7. A fluid pressure system according to claim 6 wherein the means to actuate the valves includes means responsive to predetermined pressure within the first cylinder to actuate the linkage to relieve pressure in the first cylinder.

8. In a fluid pressure system for operating a comestible dispenser including a comestible chamber having a piston therein, and a rotatable comestible scoop in communication with the chamber, the invention comprising a first cylinder and piston to actuate the piston in the first cylinder, a second piston and cylinder to actuate the scoop, a source of fluid pressure, first and second duct means for respectively connecting the pressure source with the first and second cylinders, first and second two-way valves disposed respectively in the first and second duct means, manual means to actuate the second valve to introduce fluid under pressure into the second cylinder, means actuated by the second piston to close the second valve upon operation of the scoop to form the comestible, and means to open the first valve to introduce fluid under pressure into the first cylinder to move the piston in the comestible chamber after the second piston has thus operated the scoop.

9. In a fluid pressure system for operating a comestible dispenser including a comestible chamber having a piston therein, and a rotatable comestible scoop in communication with the chamber, the invention comprising a first cylinder and piston to actuate the piston in the first cylinder, a second piston and cylinder to actuate the scoop, a source of fluid pressure, first and second duct means connecting the pressure source with the first and second cylinders, first and second two-way valves disposed respectively in the first and second duct means, manual means to actuate the second valve to introduce fluid under pressure into the second cylinder, means actuated by the second piston to close the second valve upon operation of the scoop to form the comestible, means to open the first valve to introduce fluid under pressure into the first cylinder to move the piston in the comestible chamber after the second piston has thus operated the scoop, and means responsive to predetermined pressure within the first cylinder to actuate the first valve to relieve the fluid pressure.

10. A dispensing device adapted to dispense plastic comestibles comprising a comestible chamber having a discharge opening, means for securing a container over the discharge opening, a piston in the chamber adapted to exert pressure upon a plastic comestible within the chamber, an actuating piston and cylinder for driving the first piston, means including a duct and a source of fluid under pressure connected thereto for applying a fluid pressure to the actuating cylinder and piston, a two way valve in the duct, means responsive to a predetermined value of the fluid pressure in the actuating cylinder to close the valve to isolate the pressure source from the actuating cylinder, and duct means communicating with the valve to receive fluid under pressure from the actuating cylinder to relieve the pressure therein when the actuating cylinder is isolated from the pressure source.

11. A fluid pressure system for a dispensing device comprising an actuating cylinder and piston for the device, a source of fluid pressure, a duct connecting the pressure source with the cylinder, a two-way valve in the duct, manual means to actuate the valve to connect the source of fluid under pressure to the cylinder, means responsive to a predetermined value of the fluid pressure in the actuating cylinder to close the valve to isolate the source of fluid under pressure from the actuating cylinder, and duct means communicating with the valve to receive fluid under pressure from the actuating cylinder to relieve the pressure therein when the actuating cylinder is isolated from the pressure source.

12. A device as set forth in claim 10 including a reservoir for the fluid and duct means communicating with the valve to connect the actuating cylinder to the reservoir when the valve is closed to isolate the said source from the actuating cylinder.

13. A device according to claim 12 including a molding device for the plastic comestible comprising a spout communicating with the comestible chamber, a scoop journaled for rotation in the spout, means to turn the scoop from a normal position in which its convex side is exposed to one in which such side lies within the discharge orifice, and means to actuate said means to turn the scoop after the said valve has been actuated to connect the actuating cylinder to the reservoir, whereby a ball of the comestible is formed after the pressure on the comestible within the comestible chamber has been relieved.

References Cited in the file of this patent
UNITED STATES PATENTS

| | | |
|---|---|---|
| 756,259 | Malone et al. | Apr. 5, 1904 |
| 1,091,643 | Doering Jr. | Mar. 31, 1914 |
| 1,412,727 | Walsh | Apr. 11, 1922 |
| 1,524,792 | Laskey | Feb. 3, 1925 |
| 1,544,802 | Burkeman | July 7, 1925 |
| 1,698,716 | Cox | Jan. 15, 1929 |
| 1,758,028 | Brown | May 13, 1930 |
| 1,883,829 | Skoverski | Oct. 18, 1932 |
| 1,940,508 | Proctor | Dec. 19, 1933 |
| 2,191,524 | Ellis | Feb. 27, 1940 |